United States Patent
Hijikata et al.

(10) Patent No.: US 8,077,206 B2
(45) Date of Patent: Dec. 13, 2011

(54) IMAGE PICKUP APPARATUS, COMMUNICATION CONTROL METHOD, AND PROGRAM

(75) Inventors: Hideya Hijikata, Saitama (JP); Mayumi Kamiya, Tokyo (JP)

(73) Assignee: Sony Corporation, Tokyo (JP)

( * ) Notice: Subject to any disclaimer, the term of this patent is extended or adjusted under 35 U.S.C. 154(b) by 421 days.

(21) Appl. No.: 12/258,687

(22) Filed: Oct. 27, 2008

(65) Prior Publication Data
US 2009/0160946 A1 Jun. 25, 2009

(30) Foreign Application Priority Data
Dec. 21, 2007 (JP) ................................. 2007-330093

(51) Int. Cl.
*H04N 5/225* (2006.01)
(52) U.S. Cl. ..................................... 348/207.1; 348/374
(58) Field of Classification Search ............. 348/207.99, 348/207.9, 207.11, 207.2, 207.1, 374, 375, 348/376
See application file for complete search history.

(56) References Cited

U.S. PATENT DOCUMENTS

| | | | | |
|---|---|---|---|---|
| 7,113,218 B2* | 9/2006 | Battles et al. | .................. | 348/373 |
| 7,298,416 B2* | 11/2007 | Uryu | .............................. | 348/372 |
| 7,889,240 B2* | 2/2011 | Hashimoto et al. | ......... | 348/220.1 |
| 2002/0093583 A1* | 7/2002 | Ito | ................................... | 348/373 |
| 2006/0023069 A1* | 2/2006 | Saito | ........................ | 348/207.99 |

FOREIGN PATENT DOCUMENTS

JP     2001257919 A  *  9/2001

OTHER PUBLICATIONS

Handycam Handbook DCR-SR42/SR62/SR82/SR200/SR300, Sony Corporation, 2007, 22 pages.

* cited by examiner

*Primary Examiner* — David Ometz
*Assistant Examiner* — Ahmed A Berhan
(74) *Attorney, Agent, or Firm* — Oblon, Spivak, McClelland, Maier & Neustadt, L.L.P.

(57) ABSTRACT

In an image pickup apparatus having a communication function through a predetermined communication interface and being equipped with a plurality of connectors adapted for the communication interface, the image pickup apparatus includes a connection state determining unit configured to detect respective connection states of the connectors, and when a state of two or more connectors being connected is detected, to hold communication on standby until a state of only one connector being connected is detected.

8 Claims, 9 Drawing Sheets

IMAGE PICKUP APPARATUS, COMMUNICATION CONTROL METHOD, AND PROGRAM

CROSS REFERENCES TO RELATED APPLICATIONS

The present invention contains subject matter related to Japanese Patent Application JP 2007-330093 filed in the Japanese Patent Office on Dec. 21, 2007, the entire contents of which are incorporated herein by reference.

BACKGROUND OF THE INVENTION

1. Field of the Invention

The present invention relates to an image pickup apparatus, a communication control method, and a program. More particularly, the present invention relates to an image pickup apparatus, a communication control method, and a program, which can ensure reliable communication.

2. Description of the Related Art

A video camera is connected to a personal computer (hereinafter abbreviated to a "PC") through a USB (Universal Serial Bus) cable, for example, such that photographic data recorded in, e.g., a hard disk within a camera body can be copied (backed up) in a hard disk within the PC, or can be copied in a DVD by using a DVD drive provided in the PC (see, e.g., DCR-SR62: Handycam Handbook, Internet <URL: http://cgi.sonydrive.jp/pdf_sd/ServiceArea/impdf/manual/1/3093315021DCR-SR62.html>).

Hitherto, a USB connector for connection with a USB cable is generally provided in one of a video camera body and a cradle. If the USB connector is provided in each of the video camera body and the cradle, more convenience is expected, for example, because the necessity of carrying the cradle with a user is eliminated.

SUMMARY OF THE INVENTION

Even with the USB connector being provided in each of the video camera body and the cradle, however, if only one of the video camera body and the cradle is practically connectable for communication, countermeasures are necessary against the event that the user connects USB cables to the USB connectors of both the video camera body and the cradle.

One example of the countermeasures from the viewpoint of hardware is to, when the video camera body is placed on the cradle, conceal the USB connector provided in the video camera body by the cradle to prevent two USB cables from being concurrently connected to both the USB connectors by the user.

However, both the USB connectors may become concurrently connectable, for example, if the cradle is broken or modified. Such a case may result in that USB communication becomes unstable, or that the connected PC comes into a freeze state, or that data under transfer is damaged. Accordingly, some countermeasure from the viewpoint of software is eventually necessary to cope with the event that plural USB connectors are brought into connected states.

The present invention addresses the above-described situation in the art by ensuring reliable communication even when a plurality of connectors adapted for a predetermined communication interface are provided, but only one of those connectors is practically connectable for communication.

According to an embodiment of the present invention, there is provided an image pickup apparatus having a communication function through a predetermined communication interface and being equipped with a plurality of connectors adapted for the communication interface, the image pickup apparatus including connection state determining means for detecting respective connection states of the connectors, and when a state of two or more connectors being connected is detected, holding communication on standby until a state of only one connector being connected is detected.

The image pickup apparatus may further include notifying means for notifying a user of disability of the communication when the state of two or more connectors being connected is detected.

When the state of two or more connectors being connected is changed to the state of only one connector being connected, the connection state determining means may start the communication with an apparatus connected to the image pickup apparatus through the only one connector.

In a state that communication with a predetermined apparatus is established through one among the plurality of connectors, when connection of another one among the plurality of connectors is detected, the connection state determining means may ignore the detection of the connection of the another one connector.

The predetermined communication interface may be a USB interface.

According to an embodiment of the present invention, there is provided a communication control method for an image pickup apparatus having a communication function through a predetermined communication interface and being equipped with a plurality of connectors adapted for the communication interface, the communication control method including the steps of detecting respective connection states of the connectors, and when a state of two or more connectors being connected is detected, holding communication on standby until a state of only one connector being connected is detected.

According to an embodiment of the present invention, there is provided a program causing a computer to execute communication control for an image pickup apparatus having a communication function through a predetermined communication interface and being equipped with a plurality of connectors adapted for the communication interface, the program causing the computer to execute processing including the steps of detecting respective connection states of the connectors, and when a state of two or more connectors being connected is detected, holding communication on standby until a state of only one connector being connected is detected.

According to an embodiment of the present invention, the respective connection states of the connectors are detected, and when the state of two or more connectors being connected is detected, communication is held on standby until the state of only one connector being connected is detected.

According to an embodiment of the present invention, communication can be reliably performed.

DESCRIPTION OF THE PREFERRED EMBODIMENTS

Figure 1:
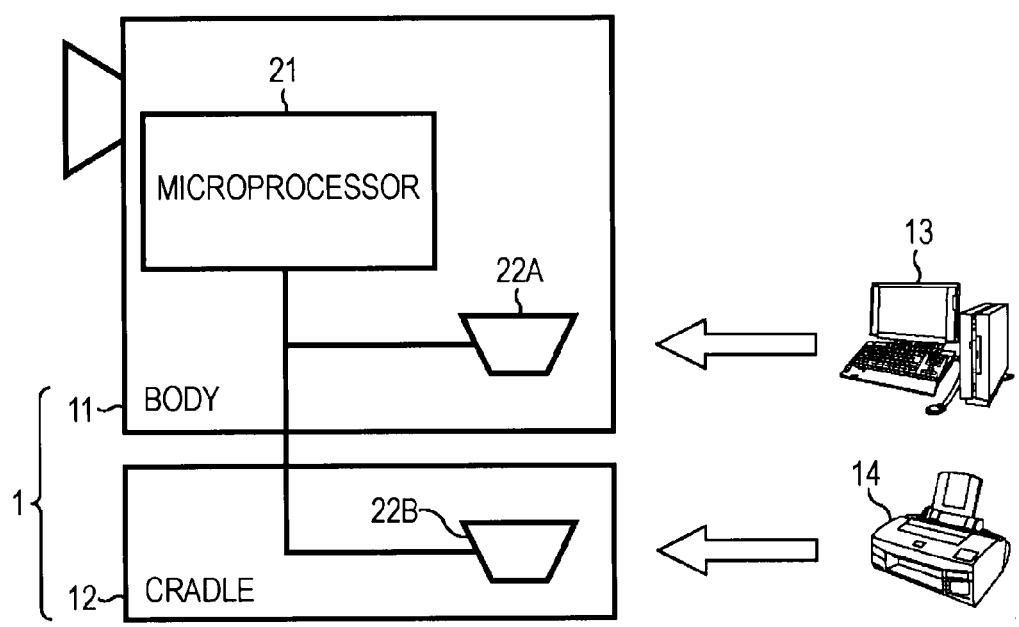
FIG. 1 illustrates an exemplary configuration of an image pickup apparatus to which an embodiment of the present invention is applied.

FIG. 1 illustrates an exemplary configuration of an image pickup apparatus to which an embodiment of the present invention is applied.

An image pickup apparatus 1, shown in FIG. 1, includes an image pickup apparatus body 11 and a cradle 12.

Each of the image pickup apparatus body 11 and the cradle 12 has one USB connector which is connectable to a USB cable (not shown) adapted for a USB communication interface. More specifically, the image pickup apparatus body 11 has a USB connector 22A, and the cradle 12 has a USB connector 22B. When a personal computer (PC) 13, a printer 14, or the like is connected to the USB connector 22A or 22B through the USB cable, the connection is detected by a microprocessor 21 in the image pickup apparatus body 11. In the following description, when discrimination between the USB connectors 22A and 22B is not particularly necessary, they are simply called the "USB connector 22".

Figure 2:
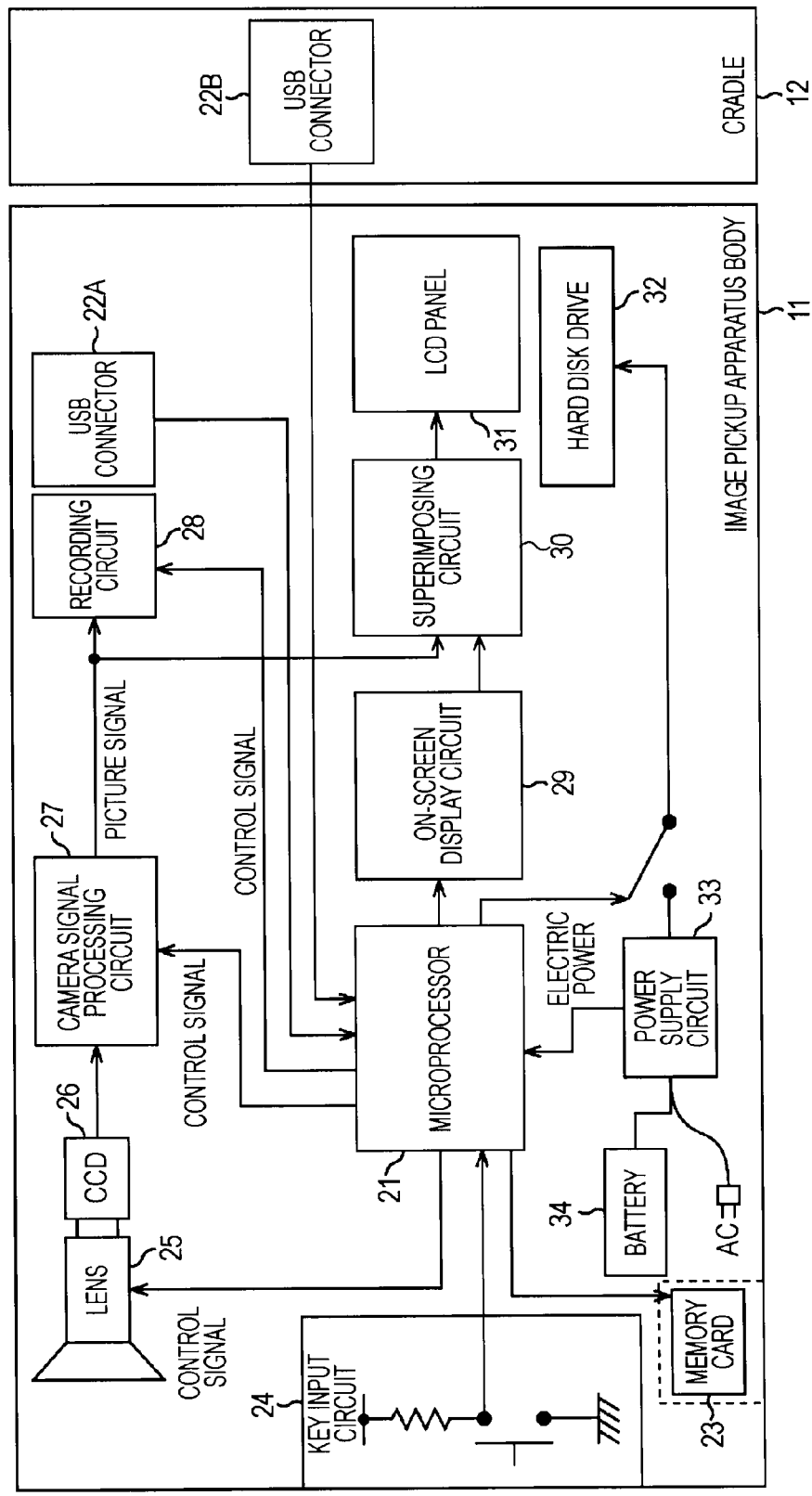
FIG. 2 is a block diagram showing a detailed exemplary configuration of the image pickup apparatus shown in FIG. 1.

FIG. 2 is a block diagram showing a detailed exemplary configuration of the image pickup apparatus 1.

The body 11 of the image pickup apparatus 1 includes the microprocessor 21, the USB connector 22A, a key input circuit 24, a lens optical system 25, a CCD sensor 26, a camera signal processing circuit 27, a recording circuit 28, an on-screen display circuit (hereinafter referred to as an "OSD circuit") 29, a superimposing circuit 30, an LCD panel 31, a hard disk drive 32, a power supply circuit 33, and a battery 34. A detachable memory card 23 is attached to the image pickup apparatus body 11. On the other hand, the cradle 12 of the image pickup apparatus 1 has the USB connector 22B.

The microprocessor 21 controls various components in the image pickup apparatus body 11 by supplying control signals to the components in the image pickup apparatus body 11 in response to an operation signal supplied from the key input circuit 24 and on the basis of preset conditions, such as the lapse of a predetermined time.

For example, the microprocessor 21 supplies a control signal to the lens optical system 25 in response to an operation signal for changing a zoom ratio, and it also supplies a control signal for instructing the start and the end of recording to the recording circuit 28 in response to an operation signal for instructing the start and the end of recording. Further, the microprocessor 21 controls supply of electric power from the power supply circuit 33 to the hard disk drive 32 depending on the situation in use, etc.

Further, the microprocessor 21 determines whether the USB cable is connected to the USB connector 22, for example, by detecting a level change in a power line (VBUS) of the USB connector 22. In addition, the microprocessor 21 supplies, to the OSD circuit 29, a screen view request signal for requesting to display, on the LCD panel 31, a screen view solely or in a superimposed relation to a picture taken by the CCD sensor 26. The screen view to be displayed in a superimposed relation to the picture taken by the CCD sensor 26 provides, e.g., a screen indicating characters, such as a current time and a record time. The screen view to be solely displayed provides, e.g., a menu screen and an alarm screen.

The USB cable is connectable to the USB connector 22 (each of 22A and 22B), and the USB connector 22 intermediates a signal between the microprocessor 21 and another apparatus (e.g., the PC 13 or the printer 14 in FIG. 1) which is connected to the USB connector 22 through the USB cable.

The key input circuit 24 is a switch circuit for detecting an operation of an operating key (not shown) by a user, and it outputs an electric signal corresponding to the user's operation. The electric signal output from the key input circuit 24 is A/D-converted and then supplied as an operation signal to the microprocessor 21.

The lens optical system 25 includes, e.g., an optical lens, a focusing mechanism, a shutter mechanism, and a diaphragm (iris) mechanism. The lens optical system 25 condenses a light (image) reflected from a subject such that the light of the subject image is focused to a light receiving portion of the CCD sensor 26.

The CCD sensor 26 performs photoelectric conversion of the light (image) focused by the lens optical system 25. An analog signal obtained as a picture signal through the conversion is supplied from the CCD sensor 26 to the camera signal processing circuit 27. Other suitable image pickup devices, such as a CMOS (Complementary Metal Oxide Semiconductor) sensor, can also be used instead of the CCD sensor 26.

The camera signal processing circuit 27 executes predetermined signal processing, such as A/D conversion, white balancing, gamma correction, and color separation, on the picture signal supplied thereto. The picture signal resulting after the processing is supplied to the recording circuit 28 and the superimposing circuit 30.

The recording circuit 28 records the picture signal, which is supplied from the camera signal processing circuit 27, in the memory card 23 or the hard disk drive 32 in accordance with the control signal supplied from the microprocessor 21.

In accordance with the screen view request signal from the microprocessor 21, the OSD circuit 29 temporarily stores, in a VRAM (not shown), a picture signal (hereinafter referred to also as an "OSD signal") for displaying a requested GUI (Graphical User Interface) screen and then supplies the OSD signal to the superimposing circuit 30.

When one of the picture signal from the camera signal processing circuit 27 and the OSD signal from the OSD circuit 29 is supplied, the superimposing circuit 30 supplies the one signal to the LCD panel 31. Also, when both the picture signal and the OSD signal are supplied, the superimposing circuit 30 produces a picture signal for superimposing a screen corresponding to the OSD signal with a picture corresponding to the supplied picture signal, and supplies the produced picture signal to the LCD panel 31.

The image pickup apparatus body 11 further includes, though not shown, a viewfinder and a lineout output terminal. The picture signal output from the superimposing circuit 30 is also supplied to the viewfinder and the lineout output terminal when necessary.

The LCD panel 31 displays a picture (screen) in accordance with the picture signal or the OSD signal supplied from the superimposing circuit 30. A touch panel is provided on a display surface of the LCD panel 31 such that a position touched by the user is informed to the microprocessor 21.

Some other suitable panel, e.g., an organic EL (Electro Luminescence) panel, can also be used instead of the LCD panel 31.

The hard disk drive 32 includes a hard disk (recording medium) and records (writes) the picture signal supplied under control of the recording circuit 28.

The power supply circuit 33 is supplied with AC source power and supplies electric power to various components in the image pickup apparatus body 11. Also, the power supply circuit 33 is supplied with source power from a battery 34 if necessary, and supplies electric power to the various components in the image pickup apparatus body 11. The battery 34 accumulates electric power supplied through the power supply circuit 33.

The memory card 23 is a nonvolatile memory, such as a flash memory, which can electrically rewrite and erase data. The user can also store the picture taken by the CCD sensor 26 in the memory card 23 instead of the hard disk drive 32.

As described above, since the image pickup apparatus 1 has the USB connector 22 in each of the image pickup apparatus body 11 and the cradle 12, an advantage is obtained in that the user can perform USB communication without carrying the cradle 12, for example, by keeping the cradle 12 connected to the PC 13 at home at all times and by using the USB connector 22A in the image pickup apparatus body 11 at an outside location (away from home).

However, the image pickup apparatus 1 is basically designed in consideration of communication with one apparatus, which is connected through the USB connector 22A or the USB connector 22B, such that the microprocessor 21 (or a USB driver implemented by the microprocessor 21) is just adaptable for communication with one apparatus.

For that reason, the image pickup apparatus 1 includes a program executed by the microprocessor 21 to cope with, from the viewpoint of software, the case where the user concurrently connects two USB cables to both the USB connector 22A and the USB connector 22B by a mistake.

Figure 3:
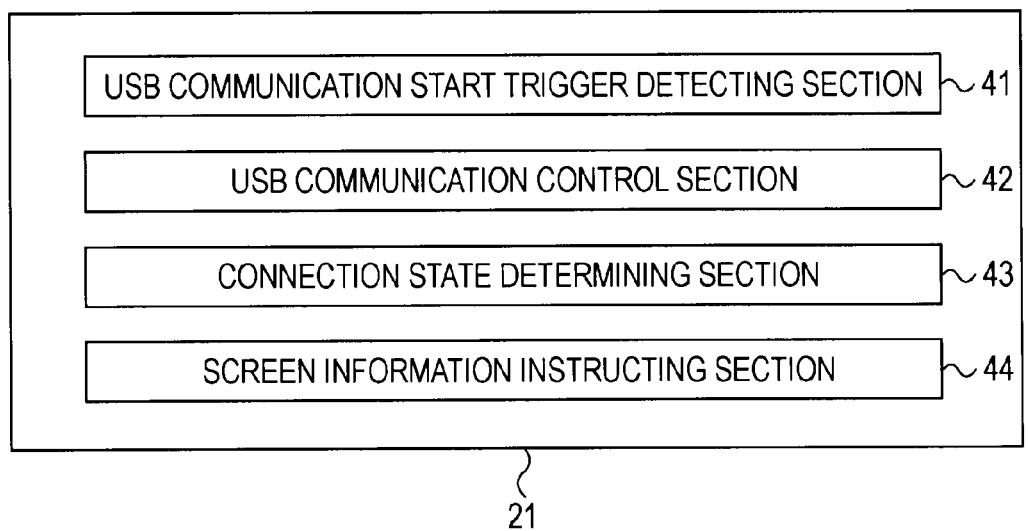
FIG. 3 is a functional block diagram for control regarding USB communication.

FIG. 3 is a functional block diagram for control regarding USB communication by the microprocessor 21, which is realized with execution of a predetermined program stored in a ROM (Read Only Memory) or the like (not shown).

The microprocessor 21 includes at least a USB communication start trigger detecting section 41, a USB communication control section 42, a connection state determining section 43, and a screen information instructing section 44.

The USB communication start trigger detecting section 41, the USB communication control section 42, the connection state determining section 43, and the screen information instructing section 44 are able to transfer control information and data among them when necessary.

The USB communication start trigger detecting section 41 detects the timing of starting the USB communication. The timing of starting the USB communication is provided when the user selects a USB communication function on the menu screen, or when the connection of the USB cable to the USB connector 22 is detected in the state that the USB cable is not connected to the USB connector 22.

In other words, the USB communication start trigger detecting section 41 detects the selection of the USB communication function on the menu screen, or the connection of the USB cable to the USB connector 22. Here, the expression "the USB cable is connected" implies not just the connection of the USB cable, and it implies that connection to another apparatus (hereinafter referred to as a "counterpart apparatus") connected to the opposite side of the USB cable is established with the connection of the USB cable.

In this embodiment, it is assumed that when the USB communication function is selected on the menu by the user, the counterpart apparatus is the PC 13, and when the USB cable is connected to the USB connector 22, the counterpart apparatus is the PC 13 or the printer 14.

The USB communication control section 42 executes the USB communication with the counterpart apparatus which is connected through the USB connector 22. The number of counterpart apparatus with which the USB communication control section 42 is able to communicate is only one.

The connection state determining section 43 detects respective connection states of the USB connectors 22A and 22B when the USB communication start trigger detecting section 41 detects a predetermined operation to start the USB communication. Further, when the state of two USB cables being connected to both the USB connectors 22A and 22B is detected, the connection state determining section 43 does not allow the USB communication control section 42 to perform the communication until the connection state of only one of the USB connectors 22A and 22B is detected. In other words, until the state of one USB cable being connected to the USB connectors 22A or 22B is detected, the connection state determining section 43 holds the USB communication control section 42 on standby without starting the USB communication.

The screen information instructing section 44 supplies the screen view request signal for requesting to display a predetermined screen to the OSD circuit 29 depending on the predetermined operation of starting the USB communication, which is detected by the USB communication start trigger detecting section 41, or on the connection states of the USB connectors 22A and 22B, which are detected by the connection state determining section 43.

Figure 4:
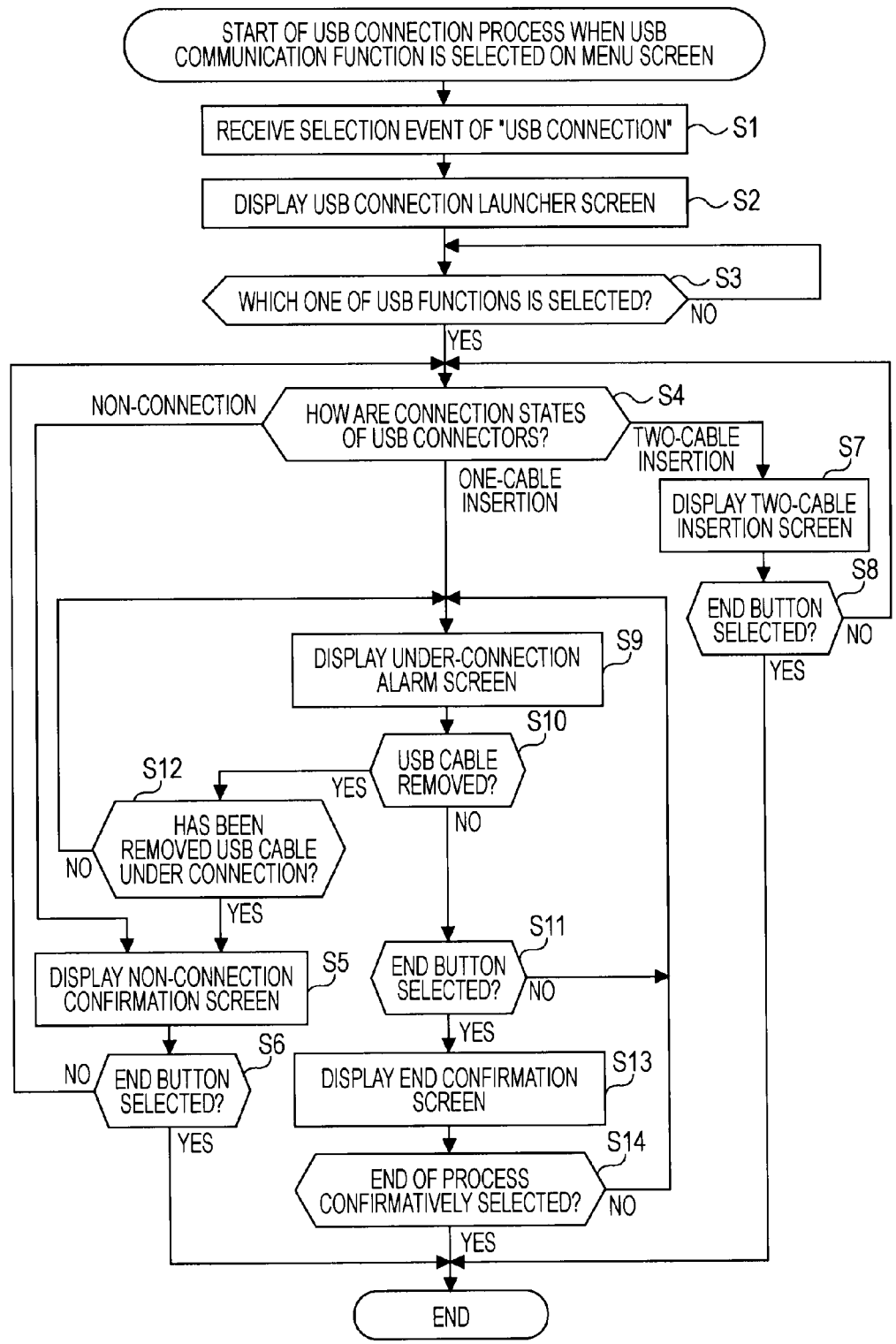
FIG. 4 is a flowchart of a USB connection process.

FIG. 4 is a flowchart of a USB connection process when the USB communication function is selected on the menu screen.

First, in step S1, the USB communication start trigger detecting section 41 detects the selection of the USB communication function by the user upon receiving a selection event indicating that an item of "USB connection" is selected on the menu screen displayed on the LCD panel 31.

In step S2, the screen information instructing section 44 acquires, from the USB communication start trigger detecting section 41, a notice indicating the selection of the USB communication function by the user, and it displays a USB connection launcher screen on the LCD panel 31. More specifically, the screen information instructing section 44 supplies, to the OSD circuit 29, a screen view request signal for requesting to display the USB connection launcher screen. Upon receiving the screen view request signal for displaying the USB connection launcher screen, the OSD circuit 29 supplies an OSD signal for displaying the USB connection launcher screen to the LCD panel 31 through the superimposing circuit 30, thus causing the LCD panel 31 to display the USB connection launcher screen.

Figure 5:
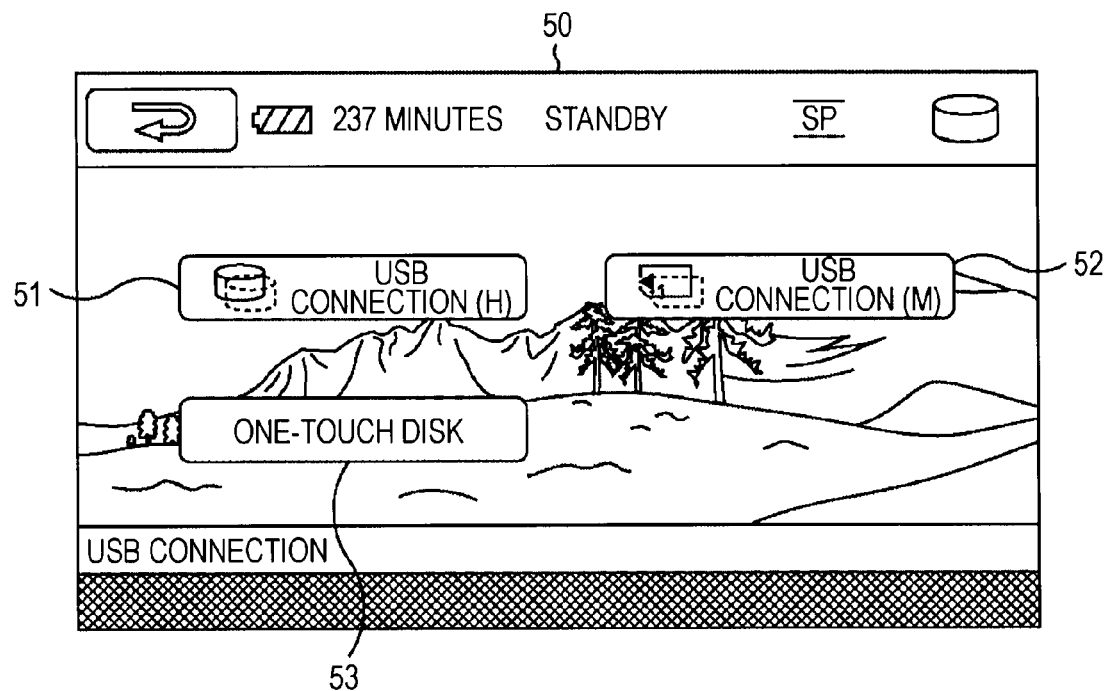
FIG. 5 illustrates an example of a USB connection launcher screen.

FIG. 5 illustrates an example of the USB connection launcher screen which is displayed on the LCD panel 31 with the processing of step S2.

On a USB connection launcher screen 50 of FIG. 5, a "USB connection (H)" button 51, a "USB connection (M)" button 52, and a "one-touch disk" button 53 are displayed in a manner selectable by the user.

The "USB connection (H)" button 51 is used to establish the connection with the PC 13, which is the counterpart apparatus connected through the USB cable, such that data recorded in (the hard disk of) the hard disk drive 32 appears as being in one drive to the PC 13.

The "USB connection (M)" button 52 is used to establish the connection with the PC 13, which is the counterpart apparatus connected through the USB cable, such that data recorded in the memory card 23 appears as being in one drive to the PC 13.

The "one-touch disk" button 53 is used to establish the connection with the PC 13, which is the counterpart apparatus connected through the USB cable, such that data recorded in (the hard disk of) the hard disk drive 32 can be written (copied) into a DVD (Digital Versatile Disk) which is inserted in a DVD drive of the PC 13. While the DVD is used in this embodiment, a recording medium into which the data is written may be an optical disk or a magneto-optical disk other than the DVD.

Returning to FIG. 4, in step S3, the connection state determining section 43 determines which one of the USB functions is selected on the USB connection launcher screen 50, i.e., whether which one of the "USB connection (H)" button 51, the "USB connection (M)" button 52, and the "one-touch disk" button 53 is selected.

In step S3, the processing is held on standby until it is determined that one of the USB functions is selected. If it is determined that one of the USB functions is selected, the processing advances to step S4.

In step S4, the connection state determining section 43 detects the connection state of the USB connector 22. If the connection state determining section 43 detects that the USB cable is not connected to any of the USB connectors 22A and 22B (i.e., non-connection), the processing advances to step S5.

On the other hand, if the connection state determining section 43 detects that two USB cables are connected to both the USB connectors 22A and 22B (i.e., two-cable insertion), the processing advances to step S7. If the connection state determining section 43 detects that the USB cable is connected to one of the USB connectors 22A and 22B (i.e., one-cable insertion), the processing advances to step S9.

Figure 6:
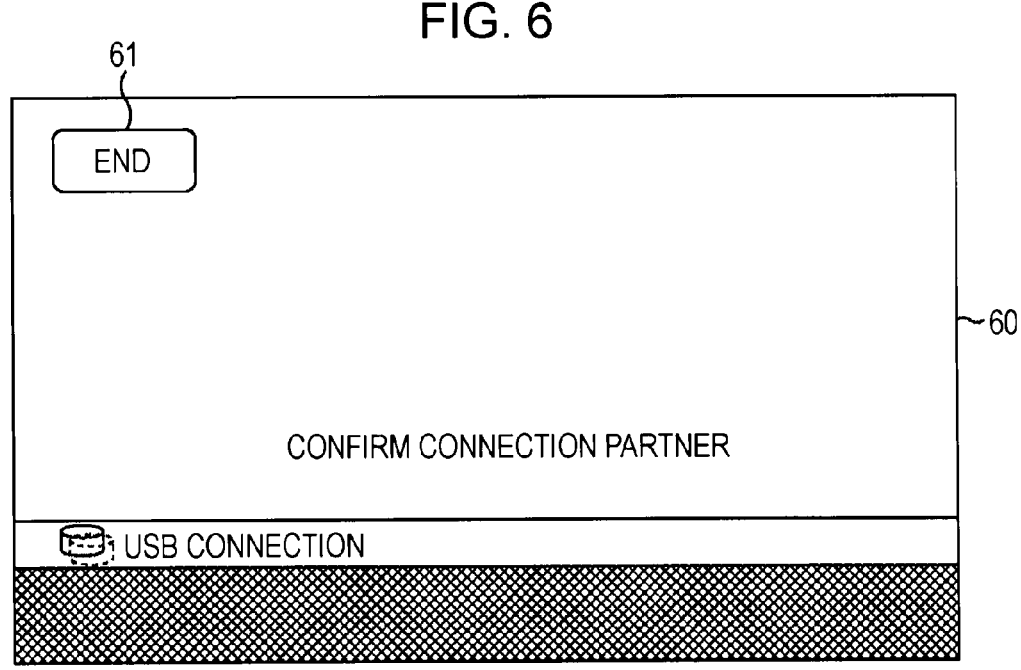
FIG. 6 illustrates an example of a connection confirmation screen.

In step S4, if the connection state determining section 43 detects that the USB cable is not connected to any of the USB connectors 22A and 22B, the screen information instructing section 44 instructs the LCD panel 31 to display a connection confirmation screen 60, shown in FIG. 6, in step S5 for prompting the user to confirm the connection of the USB cable.

In step S6, the connection state determining section 43 determines whether an "end" button 61 on the connection confirmation screen 60, shown in FIG. 6, is selected by the user. If it is determined that the "end" button 61 is selected, the USB connection process is brought to an end.

On the other hand, if it is determined in step S6 that the "end" button 61 is not selected, the processing flow returns to step S4 to repeat the processing subsequent to step S4. Accordingly, if the USB cable is not connected to any of the USB connectors 22A and 22B and the "end" button 61 is not selected, the connection confirmation screen 60 of FIG. 6 is continuously displayed on the LCD panel 31.

Figure 7:
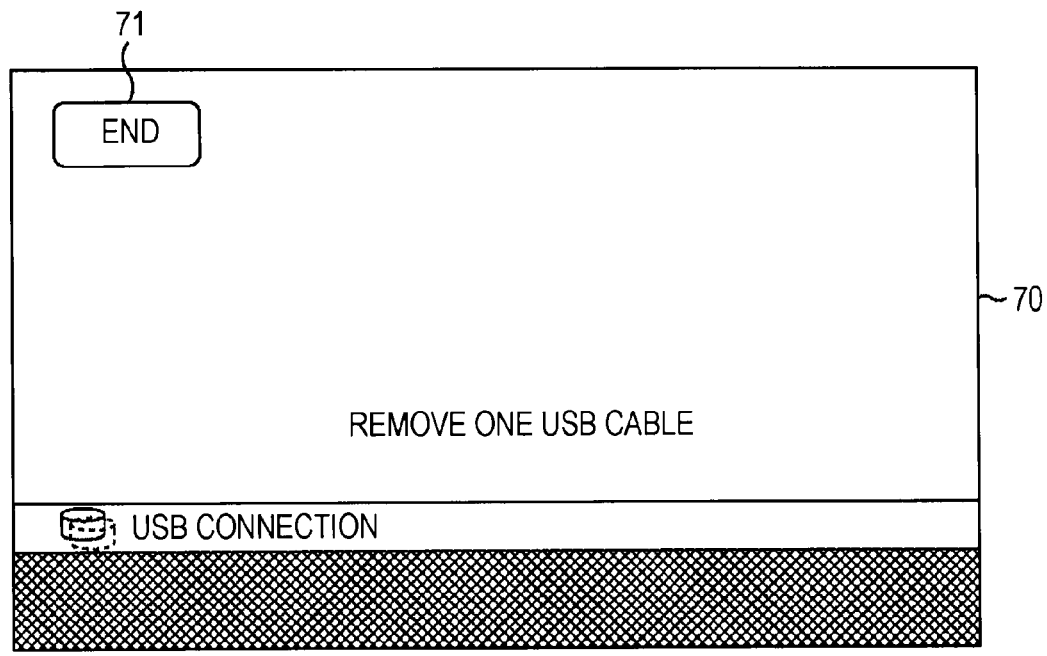
FIG. 7 illustrates an example of a two-cable insertion alarm screen.

If it is detected in step S4 that two USB cables are connected to both the USB connectors 22A and 22B, the processing advances to step S7 in which the screen information instructing section 44 instructs the LCD panel 31 to display a two-cable insertion alarm screen 70, shown in FIG. 7, for prompting the user to remove one USB cable from one of the USB connectors 22A and 22B.

In step S8, the connection state determining section 43 determines whether an "end" button 71 on the two-cable insertion alarm screen 70 is selected by the user. If it is determined that the "end" button 71 is selected, the USB connection process is brought to an end.

On the other hand, if it is determined in step S8 that the "end" button 71 is not selected, the processing flow returns to step S4 to repeat the processing subsequent to step S4. Accordingly, if two USB cables are connected to both the USB connectors 22A and 22B and the "end" button 71 is not selected, the two-cable insertion alarm screen 70 of FIG. 7 is continuously displayed on the LCD panel 31.

Figure 8:
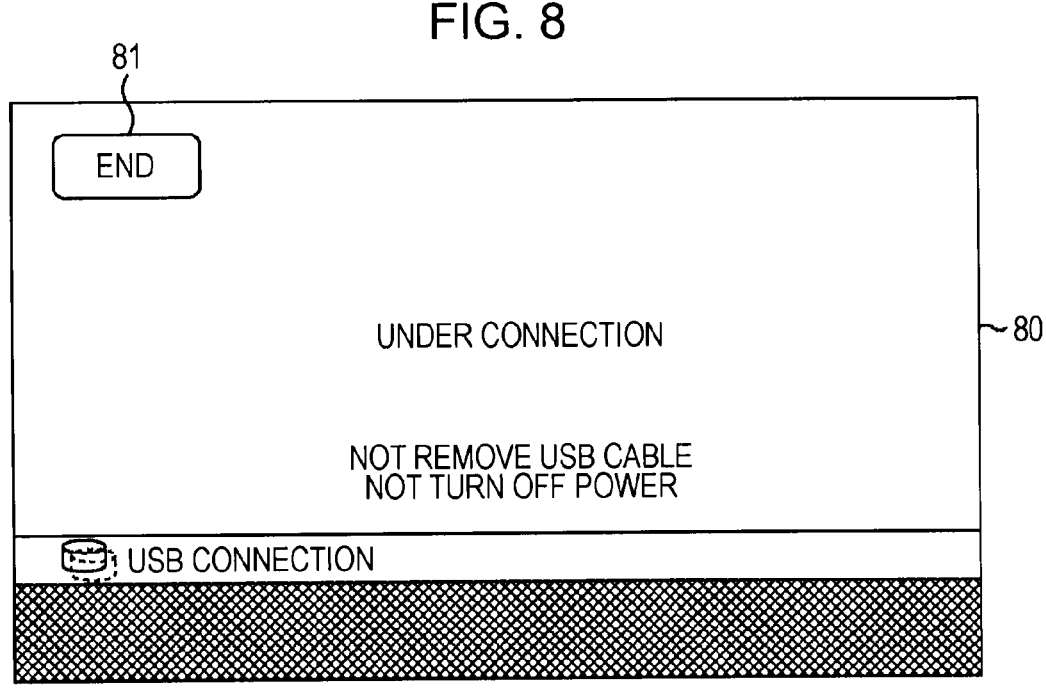
FIG. 8 illustrates an example of an under-connection alarm screen.

If it is detected in step S4 that the USB cable is connected to one of the USB connectors 22A and 22B, the processing advances to step S9 in which the screen information instructing section 44 instructs the LCD panel 31 to display an under-connection alarm screen 80, shown in FIG. 8, for providing the user with alarms, i.e., "Not remove the USB cable now being connected" and "Not turn off power".

Then, the processing advances to step S10 in which the connection state determining section 43 determines whether the USB cable having been so far connected is removed. If it is determined in step S10 that the USB cable having been so far connected is not removed, i.e., if the state of the USB cable being connected to one of the USB connectors 22A and 22B is continued, the processing advances to step S11.

In step S11, the connection state determining section 43 determines whether an "end" button 81 on the under-connection alarm screen 80 (FIG. 8) is selected by the user.

If it is determined in step S11 that the "end" button 81 is not selected by the user, the processing flow returns to step S9 to repeat the processing subsequent to step S9. On the other hand, if it is determined in step S11 that the "end" button 81 is selected by the user, the processing advances to step S13.

If the connection state determining section 43 determines in step S10 that the USB cable having been so far connected is removed, the processing advances to step S12 in which the connection state determining section 43 further determines whether communication has been performed by using the USB cable removed.

If it is determined in step S10 that the removed USB cable has been under communication, the processing advances to step S5 in which the connection confirmation screen 60 of FIG. 6 is displayed on the LCD panel 31.

On the other hand, if it is determined in step S12 that the removed USB cable has not been under communication, the processing flow returns to step S9 to repeat the processing subsequent to step S9.

The processing from step S9 to S12 can be summarized as follows. When the state of the USB cable being connected to one of the USB connectors 22A and 22B is continued, the under-connection alarm screen 80 of FIG. 8 is displayed. When the USB cable having been so far connected to one of the USB connectors 22A and 22B is removed, the connection confirmation screen 60 of FIG. 6 is displayed if the removed USB cable has been under communication, and the under-connection alarm screen 80 of FIG. 8 remains continuously displayed if the removed USB cable has not been under communication.

In addition, when a new USB cable is connected to unoccupied one of the USB connectors 22A and 22B in the state of the USB cable being connected to one of the USB connectors 22A and 22B, the connection state determining section 43 ignores a counterpart apparatus at the opposite end of the newly connected USB cable. This allows the USB communication control section 42 to continuously execute the communication with the counterpart apparatus which is already under connection.

Figure 9:
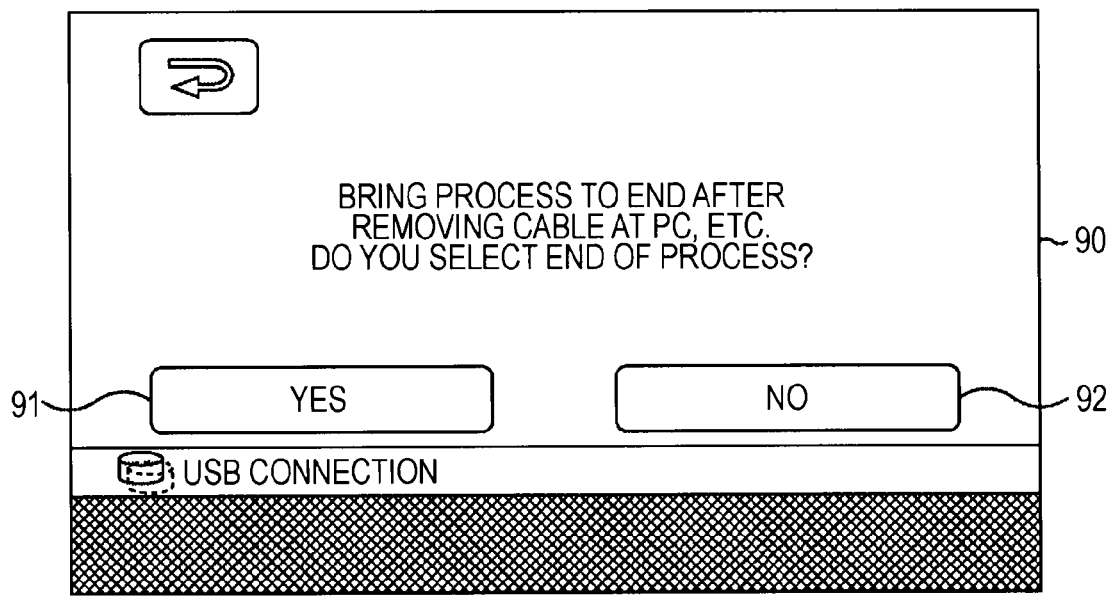
FIG. 9 illustrates an example of an end confirmation screen.

If it is determined in step S11 that the "end" button 81 on the under-connection alarm screen 80 (FIG. 8) is selected by the user, the processing advances to step S13 in which the screen information instructing section 44 instructs the LCD panel 31 to display an end confirmation screen 90, shown in FIG. 9, for prompting the user to confirm an operation of removing the USB cable at the PC 13 as a connection target.

In step S14, the connection state determining section 43 determines whether the end of the USB connection is confirmatively selected on the end confirmation screen 90 of FIG. 9. If it is determined in step S14 that the end of the USB connection is not confirmatively selected, i.e., if a "No" button 92 is selected on the end confirmation screen 90, the processing returns to step S9.

On the other hand, if it is determined in step S14 that the end of the USB connection is confirmatively selected, i.e., if a "Yes" button 91 is selected on the end confirmation screen 90, the USB connection process is brought to an end.

Thus, according to the USB connection process in FIG. 4, when the state of two USB cables being connected to both the USB connectors 22A and 22B is detected as a result of detecting the respective connection states of the USB connectors 22A and 22B, the communication is held on standby until the state of the USB cable being connected to only one of the USB connectors 22A and 22B is detected. Therefore, even when the microprocessor 21 (or the USB driver implemented by the microprocessor 21) is just adaptable for only one apparatus, reliable communication is ensured. In other words, the operation can be avoided from becoming unstable due to the state of two USB cables being connected to both the USB connectors 22A and 22B.

When the state of two USB cables being connected to both the USB connectors 22A and 22B is detected at the time of starting up the communication, the two-cable insertion alarm screen 70 of FIG. 7 is displayed on the LCD panel 31 to notify (alarm) the user of the situation that the communication is disabled. Therefore, the user can recognize the situation that the communication is not performed in the state of two USB cables being connected to both the USB connectors 22A and 22B, and can promptly cope with the situation.

Further, when, in the state of two USB cables being connected to both the USB connectors 22A and 22B, one of the two USB cables is removed, this leads to the situation capable of communicating with the counterpart apparatus which is continuously connected. Therefore, the communication is started without requesting the user to perform again, e.g., an input operation. As a result, redundant operation by the user can be eliminated.

On the other hand, when a new USB cable is connected to unoccupied one of the USB connectors 22A and 22B in the state that the connection is already established with one of the USB connectors 22A and 22B, a counterpart apparatus at the opposite end of the newly connected USB cable is ignored. Therefore, the communication with the counterpart apparatus already under connection can be maintained so as to continue reliable communication.

Figure 10:
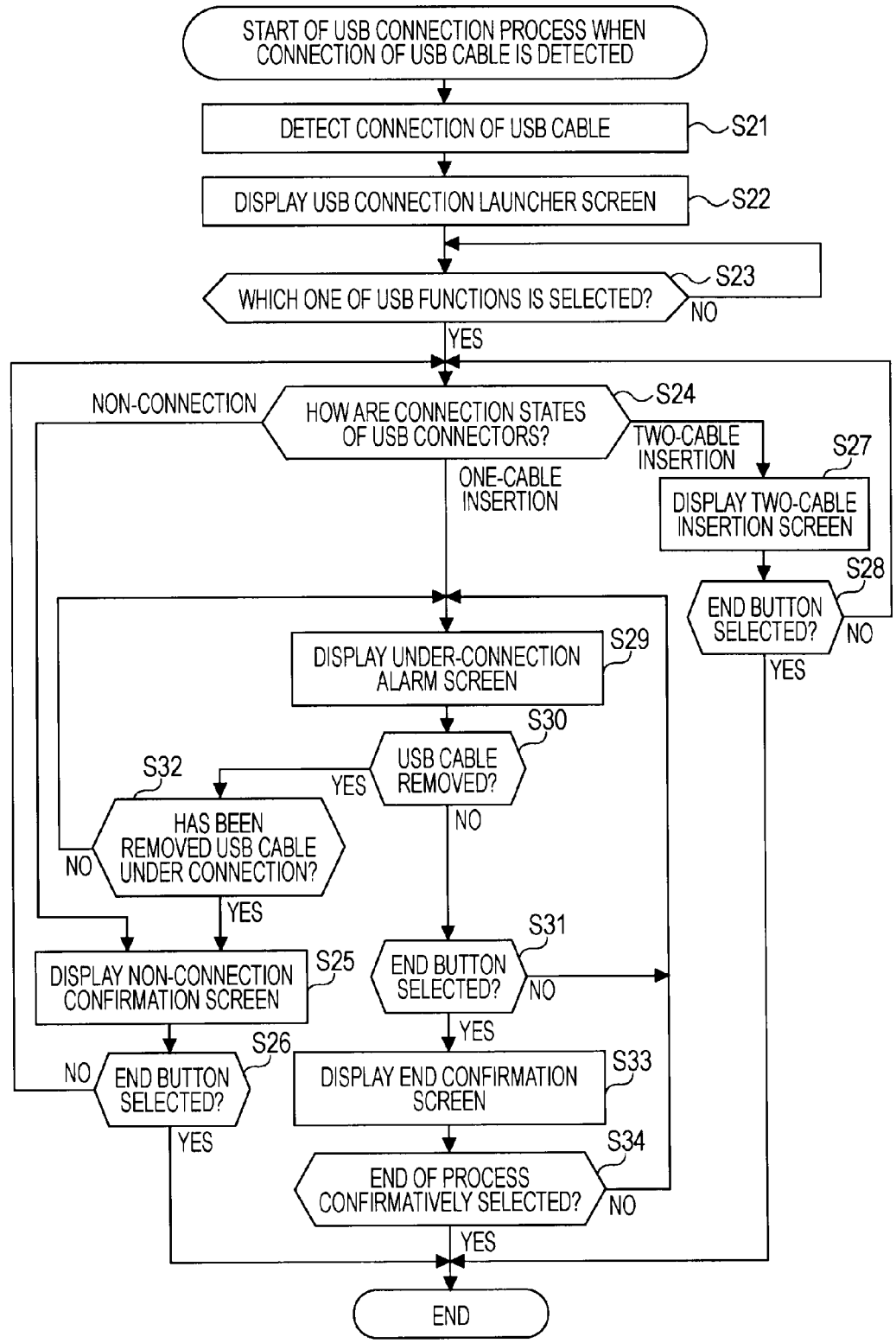
FIG. 10 is a flowchart of another USB connection process.

FIG. 10 is a flowchart of another USB connection process when connection of the USB cable to at least one of the USB connectors 22A and 22B is detected.

First, in step S21, the USB communication start trigger detecting section 41 detects that the USB cable is connected to the USB connector 22A or 22B, by detecting a level change in the power line (VBUS) of the USB connector 22A or 22B.

In step S22, the screen information instructing section 44 acquires, from the USB communication start trigger detecting section 41, a notice indicating the connection of the USB cable, and it instructs the LCD panel 31 to display a USB connection launcher screen.

Figure 11:
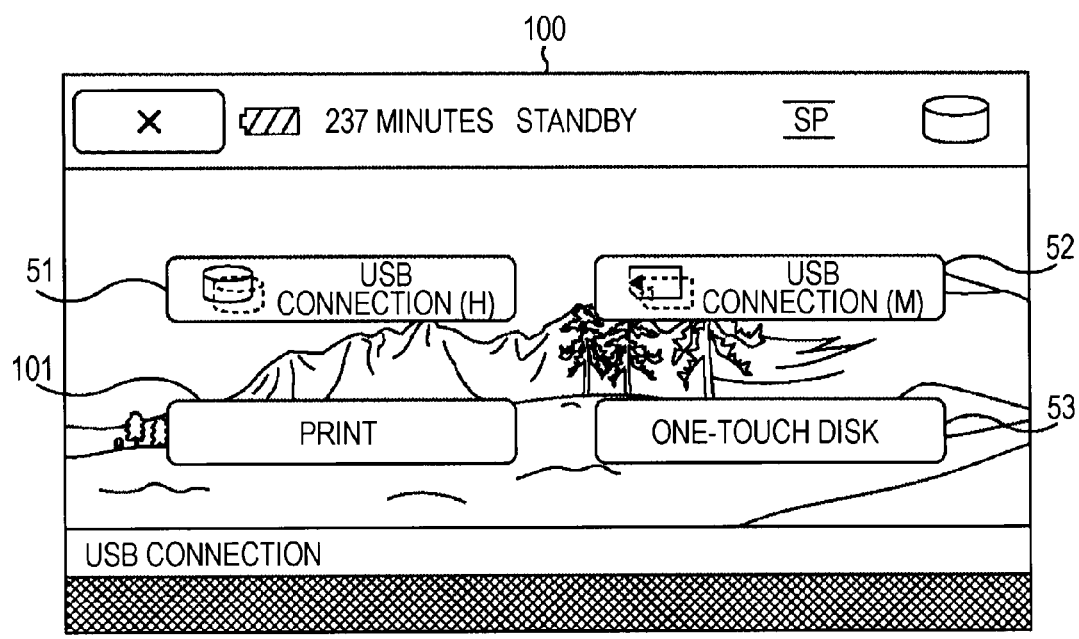
FIG. 11 illustrates an example of another USB connection launcher screen.

With the processing of step S22, a USB connection launcher screen 100 shown, by way of example, in FIG. 11 is displayed on the LCD panel 31.

In the USB connection launcher screen 100 of FIG. 11, portions corresponding to those of the USB connection launcher screen 50, shown in FIG. 5, are denoted by the same numerals and a description of those portions is omitted here unless necessary.

The USB connection launcher screen 100 of FIG. 11 displays a "print" button 101 in addition to a "USB connection (H)" button 51, a "USB connection (M)" button 52, and a "one-touch disk" button 53 which are similar to those on the USB connection launcher screen 50 of FIG. 5.

The "print" button 101 is a button selected when the counterpart apparatus is the printer 14 and when the image pickup apparatus body 11 is directly connected to the printer 14 such that an image stored in the image pickup apparatus 1 is printed without intermediation of the PC 13.

In step S23, the connection state determining section 43 determines whether any of the USB functions is selected on the USB connection launcher screen 100 of FIG. 11, i.e., whether any of the "USB connection (H)" button 51, the "USB connection (M)" button 52, the "one-touch disk" button 53, and the "print" button 101 is selected. If it is determined that any of the USB functions is selected, the processing advances to step S24.

Processes of steps S24 to S34 in FIG. 10 are the same as the above-described processes of steps S4 to S14 in FIG. 4, respectively, and a description of those processes is omitted here.

Accordingly, in the case of starting the USB communication when the connection of the USB cable to at least one of the connectors 22A and 22B is detected, the microprocessor 21 can reliably perform the communication even if the state of two USB cables being connected to both the USB connectors 22A and 22B is detected. In other words, the user can recognize that the communication is disabled in the state of two USB cables being connected to both the USB connectors 22A and 22B, and can promptly cope with such a situation.

While the embodiment has been described above in connection with the case in which the image pickup apparatus 1 has two USB connectors 22, the processing can be executed in a similar manner even when the image pickup apparatus 1 has three or more USB connectors 22.

Also, while the embodiment has been described above in connection with the case in which the communication interface is a USB interface, embodiments of the present invention are not limited to the USB communication. Embodiments of the present invention can also be applied to an apparatus which has a plurality of connectors according to the predetermined communication interface in one unit, but which has such a limitation that the apparatus is unable to communicate with a plurality of counterpart apparatuses at the same time. Another type of communication interface according to IEEE (the Institute of Electrical and Electronics Engineers) 1394, for example, can also be used.

The steps of the flowcharts described in this specification include not only the processes executed on the time serial basis in the sequence mentioned above, but also the processes which are executed individually or in parallel instead of being executed on the time serial basis.

Embodiments of the present invention are not limited to the above-described embodiment and they can be modified in various ways within the scope not departing from the gist of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus having a communication function, the image pickup apparatus comprising:
   a communication interface including a plurality of connectors; and
   connection state determining means for detecting respective connection states of the connectors, and when a state of two or more connectors being connected to respective different apparatuses external to the image pickup apparatus is detected, holding communication on standby until a state of only one connector being connected is detected.

2. The image pickup apparatus according to claim 1, further comprising:
   notifying means for notifying a user of disability of the communication when the state of two or more connectors being connected is detected.

3. The image pickup apparatus according to claim 2, wherein when the state of two or more connectors being connected is changed to the state of only one connector being connected, the connection state determining means starts the communication with an apparatus connected to the image pickup apparatus through the only one connector.

4. The image pickup apparatus according to claim 3, wherein in a state that communication with a predetermined apparatus is established through one among the plurality of connectors, when connection of another one among the plurality of connectors is detected, the connection state determining means ignores the detection of the connection of the another one connector.

5. The image pickup apparatus according to claim 4, wherein the predetermined communication interface is a USB interface.

6. A communication control method for an image pickup apparatus having a communication function through a communication interface including a plurality of connectors, the communication control method comprising:
   detecting respective connection states of the connectors, and when a state of two or more connectors being connected to respective different apparatuses external to the image pickup apparatus is detected, holding communication on standby until a state of only one connector being connected is detected.

7. A non-transitory computer-readable medium including a program, which when executed by a computer, causes the computer to execute a method of communication control for an image pickup apparatus having a communication function through a communication interface including a plurality of connectors, the method of communication control comprising:
   detecting respective connection states of the connectors, and when a state of two or more connectors being connected to respective different apparatuses external to the image pickup apparatus is detected, holding communication on standby until a state of only one connector being connected is detected.

8. An image pickup apparatus having a communication function, the image pickup apparatus comprising:
   a communication interface including a plurality of connectors; and
   a connection state determining unit configured to detect respective connection states of the connectors, and when a state of two or more connectors being connected to respective different apparatuses external to the image pickup apparatus is detected, to hold communication on standby until a state of only one connector being connected is detected.

* * * * *